(12) United States Patent
Penning et al.

(10) Patent No.: US 7,461,271 B2
(45) Date of Patent: Dec. 2, 2008

(54) OPTICAL RECORD CARRIER RECORDING APPARATUS

(75) Inventors: Frank Cornelis Penning, Eindhoven (NL); Michael Adrianus Henricus Van Der AA, Eindhoven (NL); Bart Van Rompaey, Eindhoven (NL); Bart Michiel De Boer, Eindhoven (NL); Steven Broeils Luitjens, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 5 days.

(21) Appl. No.: 10/540,701

(22) PCT Filed: Nov. 26, 2003

(86) PCT No.: PCT/IB03/05497

§ 371 (c)(1),
(2), (4) Date: Jun. 24, 2005

(87) PCT Pub. No.: WO2004/059453

PCT Pub. Date: Jul. 15, 2004

(65) Prior Publication Data

US 2006/0095801 A1 May 4, 2006

(30) Foreign Application Priority Data

Dec. 30, 2002 (EP) .................................. 02080576

(51) Int. Cl.
*G06F 1/00* (2006.01)
*G06F 1/26* (2006.01)
(52) U.S. Cl. ................ 713/300; 713/320; 713/321; 713/340; 360/73.02; 360/73.03
(58) Field of Classification Search ................ 713/300, 713/320, 321, 340; 360/73.02
See application file for complete search history.

(56) References Cited

U.S. PATENT DOCUMENTS

| | | | | |
|---|---|---|---|---|
| 5,345,347 | A * | 9/1994 | Hopkins et al. | 360/71 |
| 5,787,292 | A * | 7/1998 | Ottesen et al. | 713/300 |
| 5,907,859 | A * | 5/1999 | Shimada et al. | 711/112 |
| 6,134,069 | A * | 10/2000 | Catalano et al. | 360/75 |
| 6,215,609 | B1 * | 4/2001 | Yamashita et al. | 360/73.03 |
| 6,353,894 | B1 * | 3/2002 | Pione | 713/340 |
| 6,411,457 | B2 * | 6/2002 | Yamashita et al. | 360/73.03 |
| 6,424,600 | B1 * | 7/2002 | Okeya et al. | 368/204 |
| 6,622,252 | B1 * | 9/2003 | Klaassen et al. | 713/320 |
| 6,725,385 | B1 * | 4/2004 | Chu et al. | 713/320 |
| 6,892,313 | B1 * | 5/2005 | Codilian et al. | 713/323 |
| 6,928,567 | B2 * | 8/2005 | Nakai | 713/340 |
| 6,961,860 | B2 * | 11/2005 | Makela et al. | 713/322 |
| 7,000,134 | B2 * | 2/2006 | Tsukihashi | 713/340 |
| 7,027,843 | B2 * | 4/2006 | Cromer et al. | 455/574 |
| 7,072,637 | B2 * | 7/2006 | Makela et al. | 455/343.2 |
| 7,095,201 | B1 * | 8/2006 | Schreck et al. | 318/560 |
| 7,143,203 | B1 * | 11/2006 | Altmejd | 710/16 |
| 2005/0273638 | A1 * | 12/2005 | Kaiju et al. | 713/323 |

* cited by examiner

*Primary Examiner*—Abdelmoniem Elamin

(57) ABSTRACT

An optical recording apparatus with a small form factor optical drive for driving an optical record carrier is operable in different accessing modes having different data rates depending on the power mode of the recording apparatus. A Switch is provided in the recording apparatus for switching a controller for accessing the optical record carrier for reading data from or recording data to the optical record carrier. A first accessing mode has a low data rate and is used in a low power mode, while a second accessing mode has a high data rate and is used or allowed to be used in a high power mode.

14 Claims, 4 Drawing Sheets

OPTICAL RECORD CARRIER RECORDING APPARATUS

Figure 1:
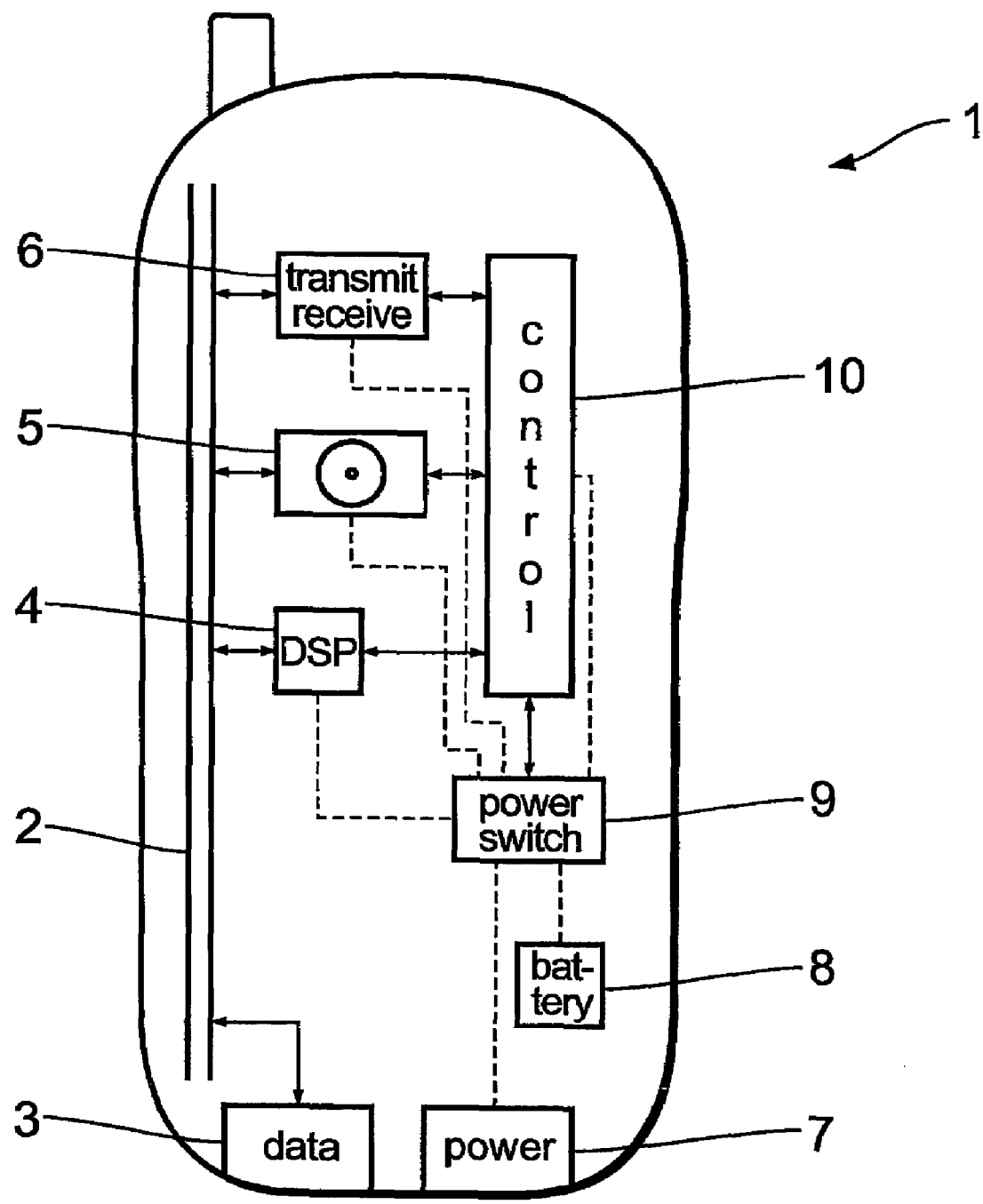

The present invention relates to an optical record carrier recording apparatus, in particular to a small form factor optical drive, and further to a portable device, such as a mobile phone or a palmtop computer.

One of the great challenges of a small form factor optical drive to be used in a portable device is the reduction of the power consumption. For writing in such a recording apparatus the record carrier, particularly the disc, needs to be rotated, a laser is pulsed using a writing IC and other electronics need to be powered. As most applications in a mobile environment, where the portable device is intended to be used, like e.g. MP3 or MPEG4 video, do not require a high bandwidth, power can be saved using burst mode writing and reading.

The basic idea of burst mode writing and reading is that the drive can operate at a relatively high bit rate or speed range, e.g. 1× Blu-ray Disc standard 36 Mbps, which is, however, never used all the time. Using buffering means the data is e.g. read back in a short time interval, after which the low data rate application like MP3 can play the data out of the buffer until the buffer needs to be filled again. During this playback time, the drive can be put into a low power mode, e.g. by putting writing and reading circuitry in a stand-by mode and turning off the disc rotation motor. Typical peak powers can be of the order 1 W, whereas an average power for a 1 Mbps application can be as low as 50 mW. A typical battery could run more than 20 hours with the constant 1 Mbps bit rate, depending on motor spin up time. Further, the burst mode has some redundancy using some extra energy. Besides that the battery emptying is a non-linear process. For instance, in a mobile phone the total battery has a capacity of 600 mAh or sometimes more, which is also needed to power the phone.

For writing of a single small data file, for instance an MP3 file, the opposite can be used and the data can directly be written from a filled buffer. The latter option can be sufficient for a mobile environment, as the bandwidth of downloading via wireless communications like GSM or 3G UMTS hardly exceeds a few Mbps.

When looking at the use of current CD-R and CD-RW record carriers, it turns out that a significant number of people use an optical disc system for downloading large amounts of data, copying large music collections or simply directly copying of complete CDs storing data and/or music. In order to do so consumers want to download or copy information to recordable or rewritable record carriers at a reasonable speed. Consumers do not want to wait hours or even more than several minutes until the record carrier is completed which is achieved by high speed CD recording apparatuses.

In a mobile environment, however, the high data rate required for such applications means either a continuously working optical drive at e.g. 36 Mbps (1×) or even operation at a higher data rate and disc speed, e.g. 3×36 Mbps (3×). This will quickly empty a battery or, which is even more important, will not be available in the portable device at all due to power limitations. For instance, in a best case situation, a typical 600 mAh battery would be exhausted after, at maximum, 10 disc downloads of 1 GB, each taking 4 mins. Therefore, downloading at a high speed and high data rate without power limitations would indeed fill a need of consumers.

U.S. Pat. No. 5,412,809 describes a disc drive power control circuit and method for controlling electric power consumption in disc drives so that computer systems such as laptop computers can conserve power, and as a result can dramatically reduce the effective life of batteries employed as a power source of the computer systems. The user is allowed to adopt the performance versus power consumption to meet the system requirements. Transient currents associated with initiation of mechanical cooperation such as an actuator for actuating a magnetic head and a spindle motor for rotating a magnetic disc at high speed with optimum access time and starting time, respectively, are effectively controlled.

It is an object of the present invention to provide an optical record carrier recording apparatus which solves the above described problems and which enables the use of high data rate applications.

This object is achieved according to the present invention by an optical record carrier recording apparatus comprising:
  an accessing means for accessing an optical record carrier for reading data from or recording data to said optical record carrier,
  a switching means for switching said accessing means between at least two accessing modes having different data rates depending on the power mode of the recording apparatus, wherein said accessing means are switched into a first accessing mode having a lower data rate than a second accessing mode when the recording apparatus is in a low power mode.

The present invention relates further to a portable device which, besides such an optical record carrier recording apparatus, further comprises:
  a data interface for transmitting and receiving data,
  a battery unit for internal supply in a first power supply mode, and
  a power interface for connecting to a an external power supply unit for external power supply in a second power supply mode.

The present invention is based on the idea to enable the accessing means for accessing the record carrier, i.e. read and/or writing means for reading from and/or writing to the record carrier, to operate in at least two different power modes, i.e. to have different data rates and bandwidths depending on what kind of power is supplied to the recording apparatus. Generally, in a low power mode the accessing means shall be operated in a first accessing mode with a low data rate to save power while in a high power mode a second accessing mode having a higher data rate can be enabled by appropriate switching means. For instance, in a mobile environment, where the recording apparatus is supplied with power from a battery, which can also be an accumulator, the recording apparatus is optimised to have a low power consumption, i.e. the accessing means are operated in the first accessing mode having a low data rate. However, if the recording apparatus or the portable device to which the recording apparatus is attached, is supplied with external power the data rate can be increased strongly, thus allowing a high speed download functionality to the portable device. In such a high power mode enough electrical power is available so that a disc used as record carrier can be rotated continuously and writing can occur at a much higher speed than would ever be available in a portable device due to its burst writing scenario described above. It is even possible to have the recording apparatus optimised in the way that the disc motor can run at an even higher speed than in the mobile environment and electronics of the recording apparatus can be clocked up in order to attain an even higher download speed.

According to a first preferred embodiment the switching means are adapted for detecting the power mode of the recording apparatus from the power supplied. Thus, independent of the power source for power supply of the recording apparatus, in case the power supplied falls below a predetermined value the accessing means can be switched into the first accessing mode having a low data rate to save power. On the contrary, if the power supplied is above said predetermined value, the high data rate shall be allowed, for instance if an application or a user requires it.

According to another embodiment an information identifying the power mode of the recording apparatus is provided to it which information can be received and evaluated by the switching means. For instance, a signal or an identifier provided from the portable device to which the recording apparatus is attached can be provided including the information if a high or a low power mode is available, for instance, if the power is supplied from an internal battery or an external power source.

For example, in case of a battery power supply mode the accessing means are switched into the first accessing mode having a low data rate while they are switched into a second accessing mode when the recording apparatus is in a mains power supply mode. Further accessing modes, for instance an accessing mode having an intermediate data rate between the low and high data rate are possible as well.

As mentioned above, the recording apparatus according to the invention is preferably applied in a portable device such as a telephone, in particular a mobile phone or a cordless phone, or a palmtop computer (PDA). Moreover, the recording apparatus is preferably a small form factor optical drive. Devices typically having the previously described intermediate data rate and power mode can be e.g. digital camcorders, digital cameras or laptops, sublaptops and handheld devices where the requirements of data rate of typically 10 Mbps are realistic but where also the battery or accumulator exceeds by far 1000 mAh, simply because battery packs are larger but also performance demands are higher.

The invention also relates to an alternative embodiment of a recording apparatus which does not contain switching means but an accessing mode interface for receiving a command from an external device, e.g. the mobile phone in which the recording apparatus is provided, which instructs the recording apparatus to switch in the appropriate accessing mode. In this case the external device, i.e. the portable device, comprises the mode switching means.

Figure 2:
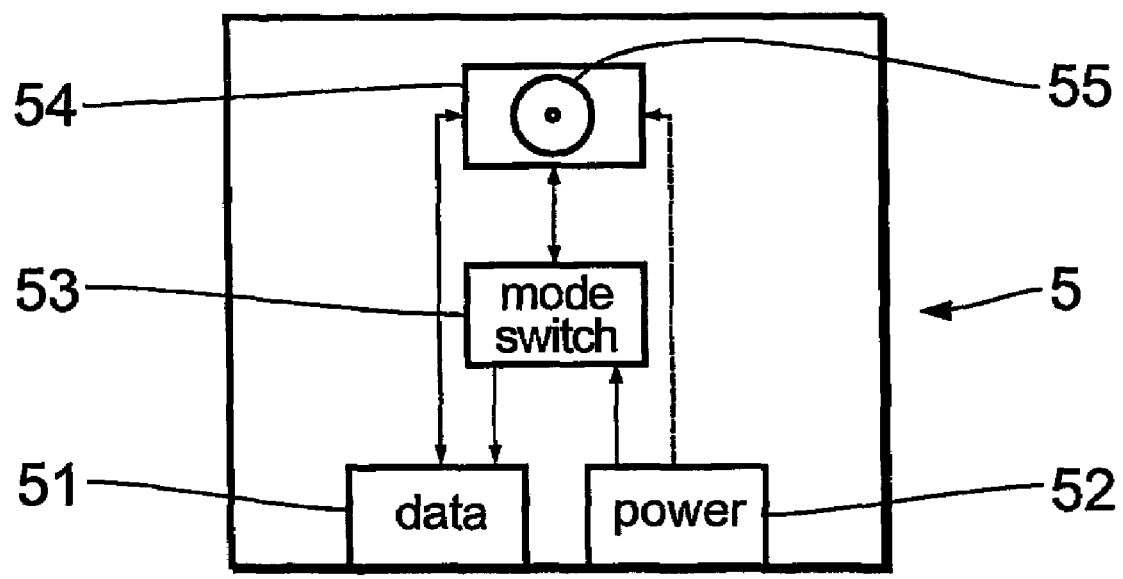

The invention will now be explained in more detail with reference to the drawings in which FIG. 1 shows a mobile phone according to the present invention, FIG. 2 shows a recording apparatus according to the present invention.

Figure 3:
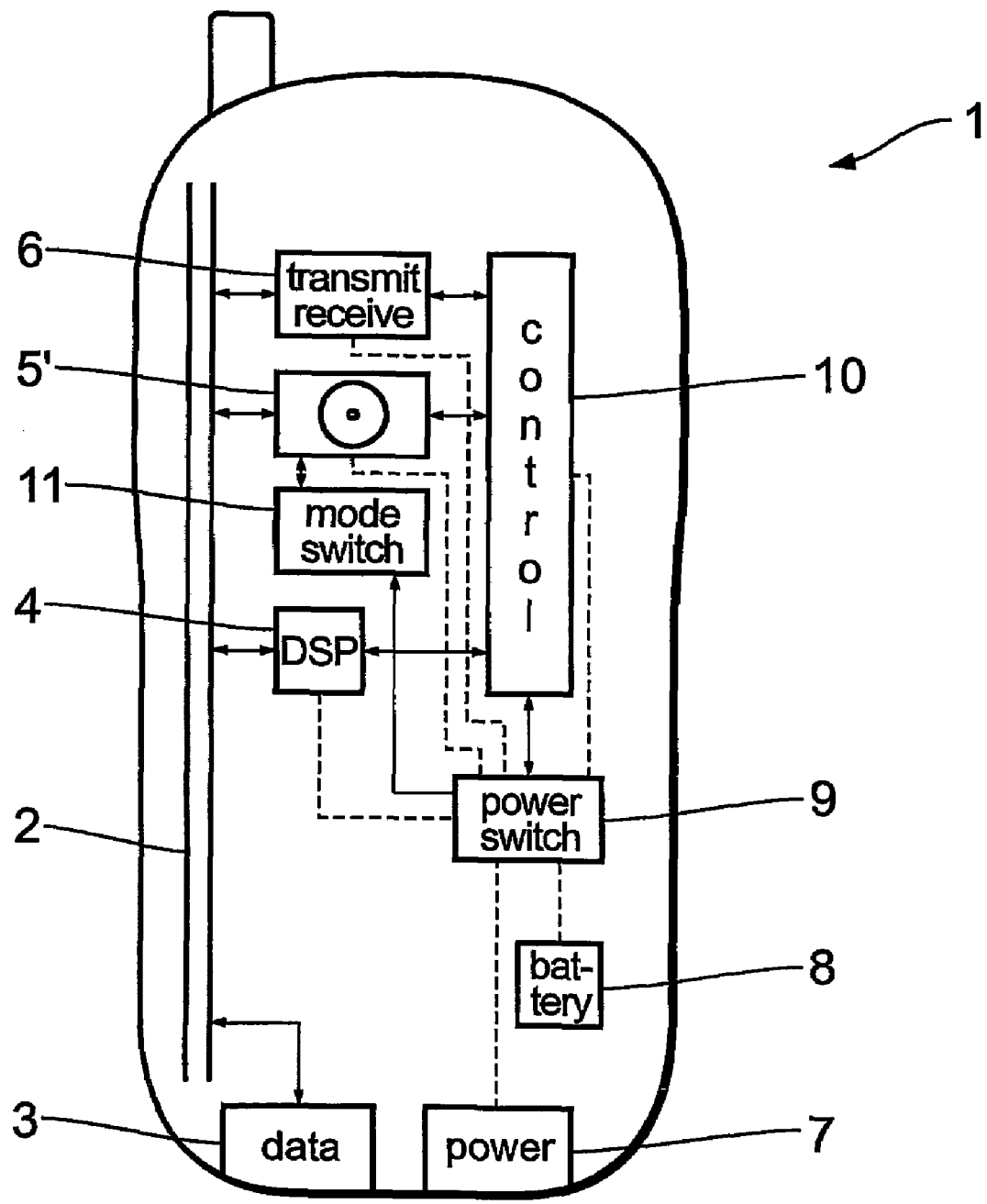
Figure 4:
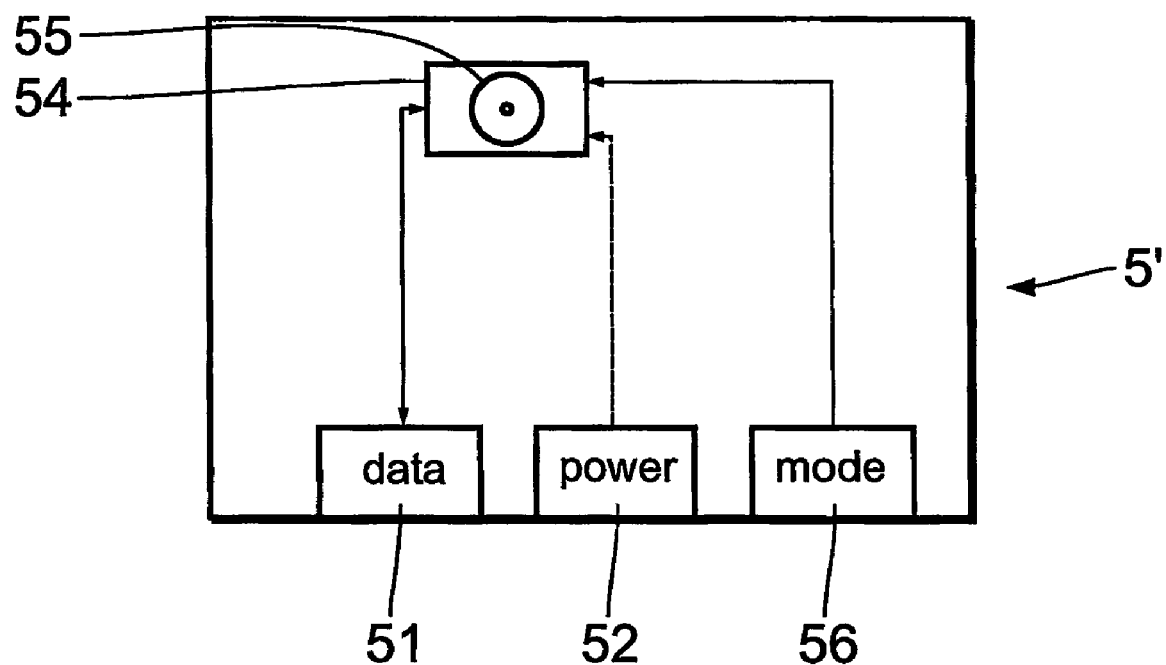

FIG. 3 shows another embodiment of a mobile phone according to the present invention, and FIG. 4 shows another embodiment of a recording apparatus according to the present invention.

FIG. 1 shows a mobile phone 1 as one example of the portable device in which the invention can be implemented. The mobile phone 1 comprises a data bus 2 to which a data interface 3 for transmitting and receiving data via a cordless or corded connection, a data processing means 4, such as a digital signal processor (DSP), a small form factor optical drive 5 and a data transmitting and receiving unit 6 for high frequency mobile data transmission and reception are connected. The mobile phone 1 further comprises a power interface 7 to which an external power source, e.g. an AC/DC power adaptor connected to a mains supply can be connected. Further a battery (or accumulator) 8 is provided as internal power supply when the mobile phone 1 is used in a mobile environment where no external power is supplied at the power interface 7. A power switch 9 is provided to switch between the two power supplies 7 and 8 and to provide the elements of the mobile phone 1 with power as indicated by the broken lines. The power switch 9 is adapted to provide power supplied at power interface 7 in case an external power source is connected there. Otherwise battery power of the battery 8 is used. For control of the elements of the mobile phone 1 a control unit 10 is provided.

More details of the small form factor optical drive 5 are shown in the block diagram of FIG. 2. The drive 5 comprises a data interface 51 connected to the bus 2 of the mobile phone 1 for data input and output. Further, the drive 5 comprises a power interface 52 connected to the power switch 9 of the mobile phone 1 for power supply of the drive 5.

A mode switch 53 is provided to switch, depending on the power supplied at power interface 52 the accessing unit 54 between different accessing modes during reading data from and/or writing data to a record carrier 55, which is a small form factor optical disc in this embodiment.

In case the mobile phone 1 is connected to an external power supply, for instance a mains supply, the accessing unit 54 of the drive 5 can be operated in a high data rate accessing mode. Because in this case enough electrical power is available the disc 55 can be rotated continuously and writing can be performed at a much higher speed compared to the low data rate accessing mode which is performed in the low power mode when the mobile phone 1 is supplied with power from the battery 8. In the high power mode it is even possible to have the drive's architecture optimised in the way that the disc motor can run at an even higher speed than in the mobile environment, and the electronics of the drives 5 can be clocked up in order to attain an even higher data rate allowing downloads of data in an even shorter time.

In order to switch between the different accessing modes the mode switch 53 must know in which kind of power mode the mobile phone 1 is or which kind of power is available to the drive 5. One possibility is that the mode switch 53 can detect the voltage level of the power supplied at power interface 52 and switch into the low data rate accessing mode requiring less power if the voltage supplied is below a predetermined threshold voltage. This will be the case in the battery supply mode if the battery voltage has already dropped by a certain amount. Another possibility is that the power switch 9 of the mobile phone 9 provides, in addition to the power itself, an information to the drive 5 indicating which power mode is currently available in the mobile phone 1, i.e. indicating battery power supply mode or mains power supply mode. Based on this information the mode switch 53 will be able to switch the accessing unit 54 into the appropriate accessing mode or, for instance, prohibit a high data rate accessing mode in case power is supplied from the battery only.

A mode switch can also be switched by a command, for instance of a user, by an application itself, e.g. software driven as a function of a required data rate demand, or by another event such as the connection of a power chord to the power interface 7 of the mobile phone 1. For instance, if the mobile phone 1 is attached with a power chord and a data link, either wired or wireless, to a computer, for which a cradle with conventional interface can be used, the accessing unit 54 can be automatically switched into a high data rate accessing mode or it can be allowed to switch into this accessing mode.

FIG. 3 shows another embodiment of a mobile phone 1 according to the invention comprising another embodiment of a drive 5' which is illustrated in FIG. 4. In this embodiment the mode switch 11 is not provided in the drive 5' but external of it as part of the mobile phone 1. Depending on the power received from the power switch 9 the mode switch 11 switches the drive 5' into the appropriate accessing mode, for instance by generating a command forwarded to the drive 5' via the mode interface 56 of drive 5'. This command is, for instance, generated in response to attaching or detaching of a power chord to the mobile phone 1. Thus, the mobile phone 1 decides about the accessing mode and the drive 5' follows.

The present invention allows the operation of the small form factor optical drive in different modes enabling different data rates and thus different writing or reading speeds. In a low power mode power is effectively saved by switching into a low data rate accessing mode while in a high power mode high speed writing and reading are available.

The invention claimed is:

1. A portable device comprising:
   a data interface for transmitting and receiving data;
   a battery unit for providing power to the portable device in a first power supply mode;
   a power interface for connecting to an external power supply unit for providing the power in a second power supply mode;
   a power switch configured to switch between the battery unit and the external power supply unit;
   an optical recording apparatus having a drive data interface, a drive power interface and a drive mode interface, wherein the drive data interface is configured for data access to and from an optical record carrier of the optical recording apparatus, the drive power interface is configured for receiving power from the power switch, and the drive mode interface is configured for receiving a mode signal; and
   a mode switch configured to detect a voltage level of the power supplied to the drive power interface through the power switch and to provide the mode signal to the drive mode interface for switching the optical recording apparatus into a first accessing mode having a lower data rate than a second accessing mode when the voltage level at the drive power interface falls below a predetermined value;
   wherein the mode switch is external to the optical recording apparatus and internal in the portable device for being switched by an application running on the optical recording apparatus.

2. The portable device of claim 1, wherein the first accessing mode is entered independent of a source of the power.

3. The portable device of claim 1, wherein the first accessing mode is entered when the power is supplied by the battery unit, and the second accessing mode is entered when the power is supplied by the external power supply unit.

4. The portable device as claimed in claim 1, wherein said portable device is a telephone, in particular a mobile phone or a cordless phone, a palmtop computer, a laptop, a digital camera or a camcorder.

5. The portable device as claimed in claim 1, wherein said optical recording apparatus is a small form factor optical drive.

6. The portable device of claim 1, wherein the optical recording apparatus is attached to the portable device, the optical recording apparatus receiving a signal from the portable device, the signal including an identifier indicating whether the first power supply mode or the second power supply mode is available.

7. The portable device of claim 6, wherein the identifier provides an indication of availability of the second power supply mode when the power is provided if from the external power supply unit.

8. The portable device of claim 6, wherein the identifier provides an indication of availability of the first power supply mode when the power is provided from the battery unit.

9. The portable device of claim 1, wherein the mode switch is switched by an application running on the optical recording apparatus.

10. An optical recording apparatus comprising:
    a drive data interface configured for data exchange between an optical record carrier of the optical recording apparatus and a portable device including the optical recording apparatus;
    a drive power interface configured for receiving power from a power switch of the portable device; and
    a drive mode interface configured for receiving a mode signal from a mode switch of the portable device;
    wherein the power switch is configured to switch between a battery unit of the portable device and an external power supply unit;
    wherein the mode switch is configured to detect a voltage level of the power supplied to the drive power interface of the optical recording apparatus through the power switch of the portable device, and to provide the mode signal to the drive mode interface for switching the optical recording apparatus into a first accessing mode having a lower data rate than a second accessing mode when the voltage level at the drive power interface falls below a predetermined value; and
    wherein the mode switch is external to the optical recording apparatus and internal in the portable device for being switched by an application running on the portable device.

11. The optical recording apparatus of claim 10, wherein the first accessing mode is entered independent of a source of the power.

12. The optical recording apparatus of claim 10, wherein the first accessing mode is entered when the power is supplied by the battery unit, and the second accessing mode is entered when the power is supplied by the external power supply unit.

13. The optical recording apparatus of claim 10, wherein the portable device is a telephone, a palmtop computer, a laptop, a digital camera or a camcorder.

14. The optical recording apparatus of claim 10, wherein the optical recording apparatus is a small form factor optical drive.

* * * * *